(12) United States Patent
Nishikawa

(10) Patent No.: US 11,368,331 B2
(45) Date of Patent: Jun. 21, 2022

(54) COMMUNICATION APPARATUS AND COMMUNICATION SYSTEM

(71) Applicant: Panasonic Intellectual Property Management Co., Ltd., Osaka (JP)

(72) Inventor: Yoshikazu Nishikawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

(21) Appl. No.: 16/930,774

(22) Filed: Jul. 16, 2020

(65) Prior Publication Data
US 2021/0021441 A1    Jan. 21, 2021

(30) Foreign Application Priority Data
Jul. 18, 2019 (JP) .............................. JP2019-132897

(51) Int. Cl.
*H04L 12/40* (2006.01)
*B60W 50/00* (2006.01)

(52) U.S. Cl.
CPC ....... *H04L 12/40019* (2013.01); *B60W 50/00* (2013.01); *H04L 12/40123* (2013.01);
(Continued)

(58) Field of Classification Search
CPC ................ G06F 13/37; G06F 13/4068; H04L 12/40019; H04L 12/40123;
(Continued)

(56) References Cited

U.S. PATENT DOCUMENTS 6,747,971 B1 * 6/2004 Hughes ............... H04L 49/3081
370/387
8,122,159 B2 * 2/2012 Monreal ................ G06F 13/37
710/9
(Continued)

OTHER PUBLICATIONS

DENSO Corporation et al., "DSI3 Bus Standard, Revision 1.00", Feb. 16, 2011, pp. 1-45.
(Continued)

*Primary Examiner* — Stephen J Clawson
(74) *Attorney, Agent, or Firm* — Greenblum & Bernstein, P.L.C.

(57) ABSTRACT

A communication apparatus installed on a vehicle as a master apparatus includes: a slave port communicating with an on-vehicle control apparatus; two or more master ports are paired with two or more slave apparatuses installed on the vehicle, and communicate with the two or more slave apparatuses using different channels based on Distributed System Interface (DSI) protocol; two or more buffer memories provided corresponding to the two or more master ports; and a control section sorting and storing commands addressed to the two or more slave apparatuses, respectively, from the on-vehicle control apparatus into the two or more buffer memories, respectively, and when receiving a trigger instructing transmission of the commands from the on-vehicle control apparatus, reading the commands from the two or more buffer memories, and simultaneously transmitting the commands from the two or more master ports, respectively.

6 Claims, 6 Drawing Sheets (52) U.S. Cl.
CPC ............... *B60W 2420/54* (2013.01); *H04L 2012/40215* (2013.01); *H04L 2012/40273* (2013.01)

(58) Field of Classification Search
CPC .......... H04L 2012/40215; H04L 2012/40273; B60W 50/00; B60W 2420/54
See application file for complete search history.

(56) References Cited

U.S. PATENT DOCUMENTS

| | | | |
|---|---|---|---|
| 9,172,565 B2* | 10/2015 | Cadugan | H04L 7/042 |
| 9,559,389 B2* | 1/2017 | Greef | B60L 58/21 |
| 2003/0099193 A1* | 5/2003 | Liu | G01N 33/586 |
| | | | 370/389 |
| 2012/0102249 A1* | 4/2012 | Duroiu | G06F 13/18 |
| | | | 710/110 |
| 2013/0311691 A1* | 11/2013 | Barrenscheen | G06F 13/364 |
| | | | 710/110 |
| 2016/0212070 A1* | 7/2016 | Chang | H04L 12/18 |
| 2018/0297165 A1* | 10/2018 | Ohno | G01S 17/04 |
| 2019/0116121 A1* | 4/2019 | Friedman | H04L 47/11 |
| 2019/0215233 A1* | 7/2019 | Huang | H04L 41/0654 |
| 2019/0361833 A1* | 11/2019 | Huang | G06F 13/4068 |
| 2020/0290633 A1* | 9/2020 | Nishikawa | B60W 50/045 |
| 2020/0373959 A1* | 11/2020 | Abouda | H04L 12/40169 |

OTHER PUBLICATIONS

NXP Semiconductors, "33SA0528", Document No. MC33SA0528, Data sheet: Advance Information, Rev. 3.0, Jul. 2016, pp. 1-40.

* cited by examiner

COMMUNICATION APPARATUS AND COMMUNICATION SYSTEM

TECHNICAL FIELD

The present disclosure relates to a communication apparatus and a communication system.

BACKGROUND ART

Conventionally, there is known a communication system in which communication is performed between a master apparatus and one or more slave apparatuses by switching between two different communication methods.

For example, Non Patent Literature (hereinafter, referred to as "NPL") 1 discloses a communication system that uses Distributed System Interface (DSI) 3 protocol. DSI3 protocol defines two communication methods of Command and Response Mode (CRM) communication and Periodic Data Collection Mode (PDCM) communication.

CITATION LIST

Non Patent Literature

NPL 1
 DSI3 Bus Standard Revision 1.00 Feb. 16, 2011
NPL 2
 NXP Semiconductor MC33SA0528 Datasheet Rev. 3.0, July 2016

SUMMARY OF INVENTION

Technical Problem

However, in the conventional communication system, there is room for improvement in terms of synchronizing two or more slave apparatuses.

An object of an aspect of the present disclosure is to provide a communication apparatus and a communication system that are capable of realizing synchronization between two or more slave apparatuses.

Solution to Problem

A communication apparatus according to one aspect of the present disclosure is a communication apparatus that is installed on a vehicle as a master apparatus, including: a slave port that is used in communication with an on-vehicle control apparatus; two or more master ports that are paired with two or more slave apparatuses installed on the vehicle, and communicate with the two or more slave apparatuses using different channels based on Distributed System Interface (DSI) protocol; two or more buffer memories that are paired with the two or more master ports; and a control circuit that sorts and stores commands addressed to the two or more slave apparatuses, respectively, received from the on-vehicle control apparatus into the two or more buffer memories, respectively, and when the control circuit receives a trigger instructing transmission of the commands from the on-vehicle control apparatus, the control circuit reads the commands from the two or more buffer memories, and simultaneously transmits the commands from the two or more master ports, respectively.

A communication system according to one aspect of the present disclosure includes: the communication apparatus according to one aspect of the present disclosure that is used as a master apparatus; two or more slave apparatuses that communicate with the communication apparatus; and an on-vehicle control apparatus that communicates with the communication apparatus.

DESCRIPTION OF EMBODIMENTS

<Findings Leading to the Present Disclosure>

First, findings leading to the present disclosure will be described.

Here, a sonar system that is installed on a vehicle will be described as an example. The sonar system includes, for example, two or more ultrasonic sonar sensors (an example of one or more slave apparatuses), and a master apparatus that communicates with the ultrasonic sonar sensors.

The ultrasonic sonar sensor transmits sound waves, then receives reflected waves from an object, and estimates a distance between the ultrasonic sonar sensor and the object based on a period of time between a time of starting transmission of the sound waves and a time of receiving the reflected waves.

Here, the sound waves transmitted from one ultrasonic sonar sensor are also received by another ultrasonic sonar sensor which does not transmit the sound waves. Accordingly, in a case where two or more ultrasonic sonar sensors are not synchronously controlled, differences occur in times of starting transmission of sound waves that are recognized by the respective ultrasonic sonar sensors, and measurement variations occur in periods of time until times of receiving reflected waves. As a result, it may be difficult to realize an accurate distance estimation with the sonar system.

An object of the present disclosure is to realize synchronization control of two or more ultrasonic sonar sensors.

Heretofore, the findings leading to the present disclosure have been described.

Embodiment of the Present Disclosure

Hereinafter, an embodiment of the present disclosure will be described with reference to the drawings. Note that, common constituent elements in each drawing will be denoted by the same reference signs, and description thereof will be omitted as appropriate.

[Configuration]

Figure 1A:
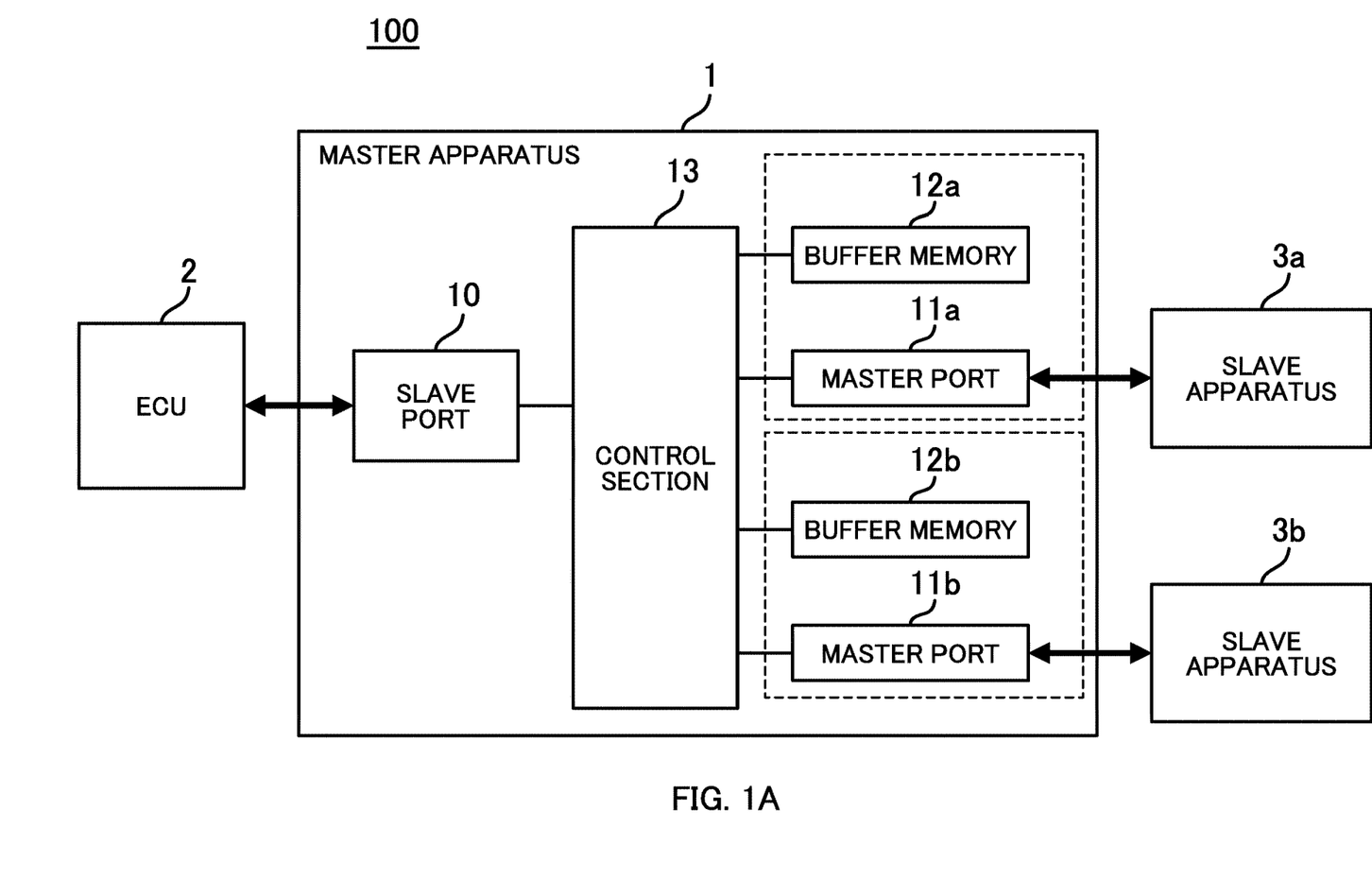
FIG. 1A is a block diagram of an example of a configuration of a communication system and a master apparatus according to an embodiment of the present disclosure.

First, a configuration of communication system 100 and master apparatus 1 according to the present embodiment will be described with reference to FIG. 1A. FIG. 1A is a block diagram of an example configuration of communication system 100 and master apparatus 1 in the present embodiment.

Communication system 100 illustrated in FIG. 1A is a communication system that uses DSI3 protocol as a communication means between master apparatus 1 and slave apparatuses 3a and 3b, for example. As described above, DSI3 protocol defines two communication methods of CRM communication and PDCM communication. Accordingly, switching between CRM communication and PDCM communication is performed in communication system 100.

According to CRM communication, bidirectional communication can be performed between master apparatus 1 and slave apparatuses 3a and 3b (with the proviso that one-way communication from master apparatus 1 to slave apparatuses 3a and 3b is also possible). PDCM communication, on the other hand, is characterized in that one-way communication from slave apparatuses 3a and 3b to master apparatus 1 is performed in a case where slave apparatuses 3a and 3b receive a Broadcast Read Command (BRC) trigger from master apparatus 1. Note that, PDCM communication enables data communication at a higher rate than CRM communication.

As illustrated in FIG. 1A, communication system 100 includes master apparatus 1, electronic control unit (ECU) 2, and slave apparatuses 3a and 3b.

Figure 1B:
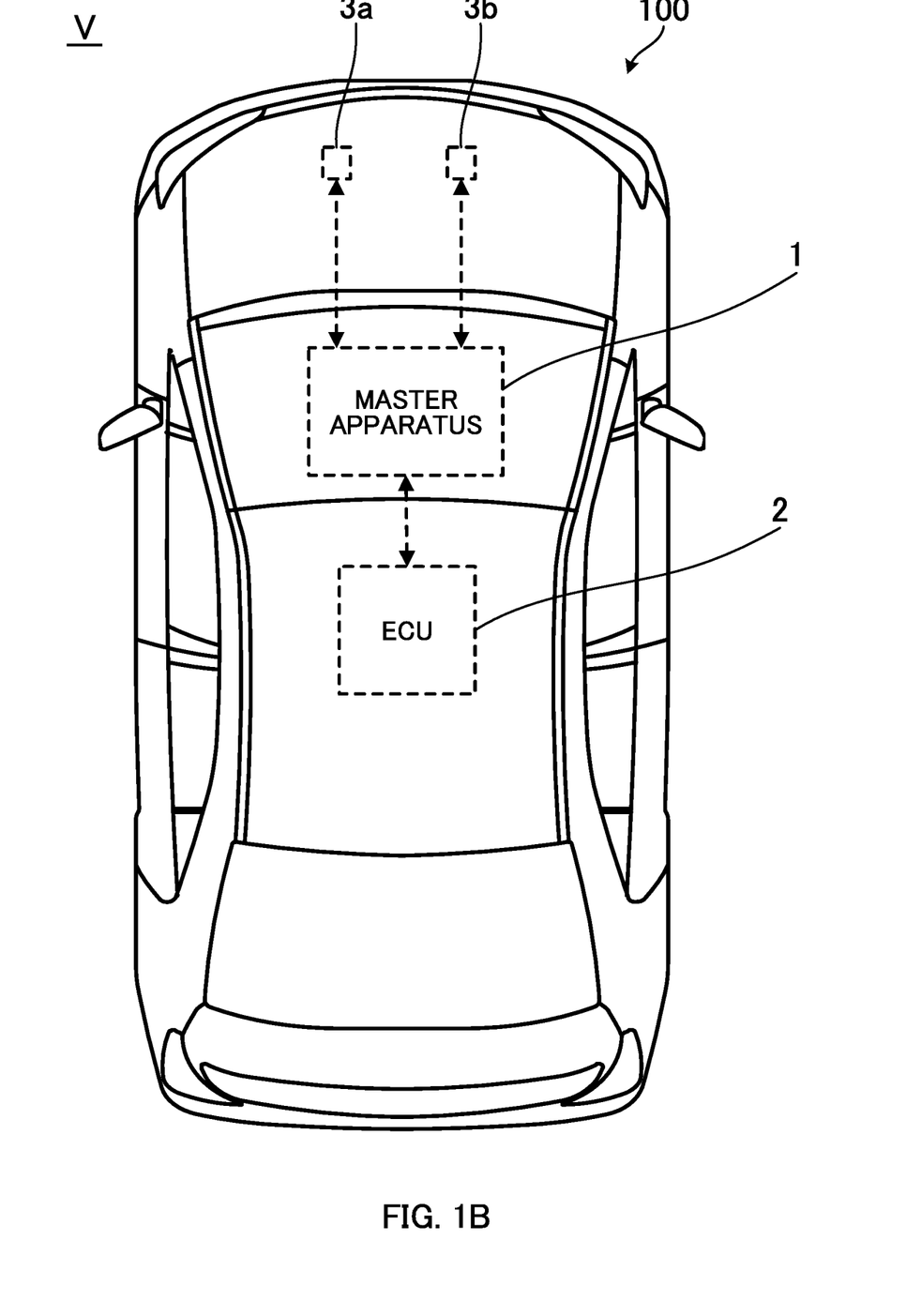
FIG. 1B is a schematic diagram of an example of a vehicle according to the embodiment of the present disclosure.

In the present embodiment, as illustrated in FIG. 1B, a case where communication system 100 is a sonar system to be installed on vehicle V will be described as an example. For example, slave apparatuses 3a and 3b are ultrasonic sonar sensors that perform sensing of a forward side of vehicle V. ECU 2 corresponds to an example of an "on-vehicle control apparatus". Note that, although FIG. 1B exemplifies a case where vehicle V is a passenger vehicle, the vehicle on which communication system 100 is installed may be a vehicle other than the passenger vehicle (for example, a commercial vehicle). Further, positions at which master apparatus 1, ECU 2, and slave apparatuses 3a and 3b are installed, respectively, are not limited to the positions illustrated in FIG. 1B.

For example, slave apparatus 3a may transmit sound waves itself and measure reflected waves of the sound waves, while slave apparatus 3b may not transmit sound waves itself, but may measure reflected waves of the sound waves transmitted by slave apparatus 3a. Alternatively, slave apparatus 3b may transmit sound waves itself and measure reflected waves of the sound waves, while slave apparatus 3a may not transmit sound waves itself, but measure reflected waves of the sound waves transmitted by slave apparatus 3b.

Note that, although the present embodiment describes a case, as an example, where the number of slave apparatuses is two, the number of slave apparatuses may be two or more. Further, although the present embodiment describes a case, as an example, where the one or more slave apparatuses are sonar sensors that perform sensing of the forward side of the vehicle, the one or more slave apparatuses may be ultrasonic sonar sensors that perform sensing of a rear side, a left side, a right side, or other positions of the vehicle. Further, although the present embodiment describes a case, as an example, where the one or more slave apparatuses are ultrasonic sonar sensors, such an example is not restrictive, and the one or more slave apparatuses may be other on-vehicle devices.

Hereinafter, a configuration of master apparatus 1 will be described.

Master apparatus 1 is a communication apparatus that communicates with ECU 2, and slave apparatuses 3a and 3b, respectively.

As illustrated in FIG. 1A, master apparatus 1 includes slave port 10 for one channel, master ports 11a and 11b and buffer memories 12a and 12b for two channels, and control section 13. Note that, portions surrounded by dotted lines illustrated in FIG. 1A each indicate a combination (pairing) of one master port and one buffer memory corresponding to one channel. For example, master port 11a and buffer memory 12a are provided (paired) for a channel corresponding to slave apparatus 3a. Further, master port 11b and buffer memory 12b are provided (paired) for a channel corresponding to slave apparatus 3b.

Slave port 10 is a port that is electrically connected to ECU 2 and communicates with ECU 2. For example, Serial Peripheral Interface (SPI) communication is performed between slave port 10 and ECU 2.

Master port 11a is a port that is electrically connected to slave apparatus 3a, is provided for the channel corresponding to slave apparatus 3a, and communicates with slave apparatus 3a using the channel. Between master port 11a and slave apparatus 3a, communication in compliance with DSI protocol, for example, either CRM communication or PDCM communication, is performed.

Master port 11b is a port that is electrically connected to slave apparatus 3b, is provided for the channel corresponding to slave apparatus 3b, and communicates with slave apparatus 3b using the channel. Between master port 11b and slave apparatus 3b, communication in compliance with DSI protocol, for example, either CRM communication or PDCM communication, is performed.

Buffer memory 12a is a memory that is provided corresponding to master port 11a, and temporarily stores a command addressed to slave apparatus 3a issued by ECU 2.

Buffer memory 12b is a memory that is provided corresponding to master port 11b, and temporarily stores a command addressed to slave apparatus 3b issued by ECU 2.

In the present embodiment, a case where the commands described above are commands in each of which conditions for operation of slave apparatus 3a or 3b are set will be described as an example. For example, in the commands, an instruction to transmit sound waves, conditions for wave transmission, and the like are set for one or more slave apparatuses that transmit sound waves, and an instruction to measure reflected waves, conditions for measurement, and the like are set for one or more slave apparatuses that measure reflected waves.

Further, in the present embodiment, a case where the commands are unicast commands is described as an example, but the commands may be global commands. The unicast commands are commands for which there are responses from slave apparatuses 3a and 3b, and the global commands are commands for which there are no responses from slave apparatuses 3a and 3b. Further, the commands described in the present embodiment are CRM commands.

Control section 13 controls communication between ECU 2 and slave apparatuses 3a and 3b. Details of the control to be performed by control section 13 will be described later.

As described above, master apparatus 1 of the present embodiment includes master ports 11a and 11b that are connected in a one-to-one way to slave apparatuses 3a and 3b, respectively, and includes buffer memories 12a and 12b that are separately provided so as to correspond to master ports 11a and 11b (that may be replaced with slave apparatuses 3a and 3b), respectively.

Heretofore, the configuration of master apparatus 1 has been described.

Note that, although not illustrated, master apparatus 1 includes, as hardware, a central processing unit (CPU), a read only memory (ROM) storing computer programs, and a random access memory (RAM), for example. Each function of master apparatus 1 described in the present embodiment is implemented by the CPU executing a computer program read from the ROM. Note that, such an example is not restrictive, and master apparatus 1 may each be configured with, for example, a simple hardware logic that does not include the CPU. Further, master apparatus 1 may be implemented as an integrated circuit (IC) in which each function is built on a substrate. That is, for example, each function of master apparatus 1 may be implemented by software in coordination with hardware, or may be implemented by hardware alone.

[Operation]

Figure 2:
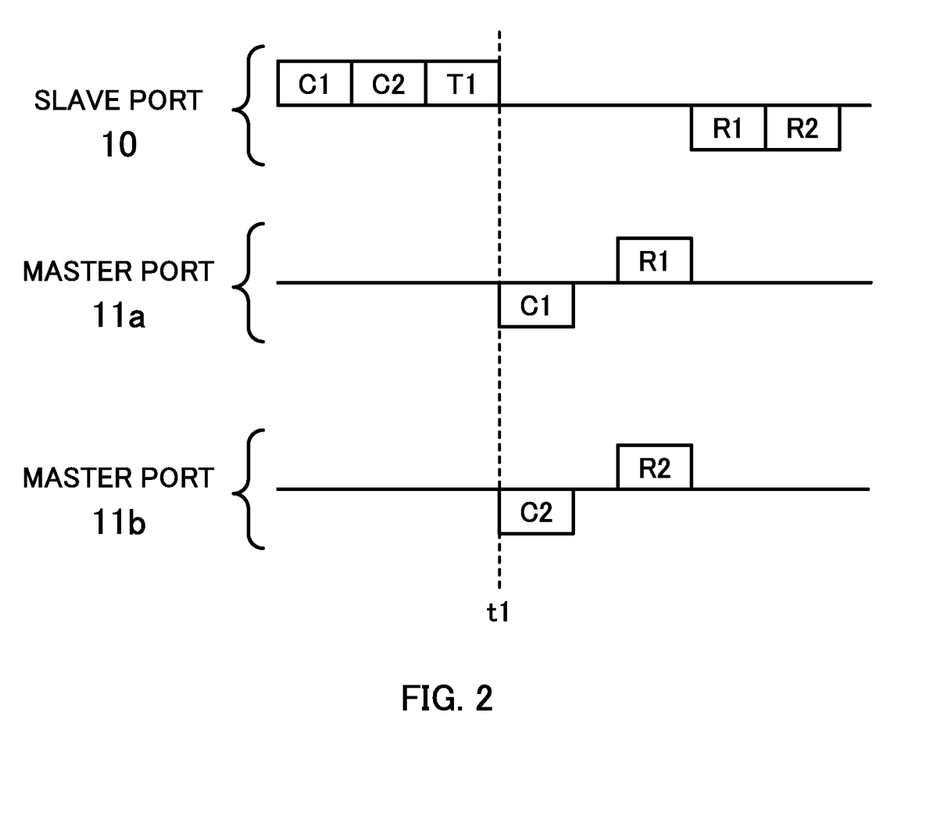
FIG. 2 is a schematic diagram provided for describing operation example 1 of the master apparatus according to the embodiment of the present disclosure.
Figure 3:
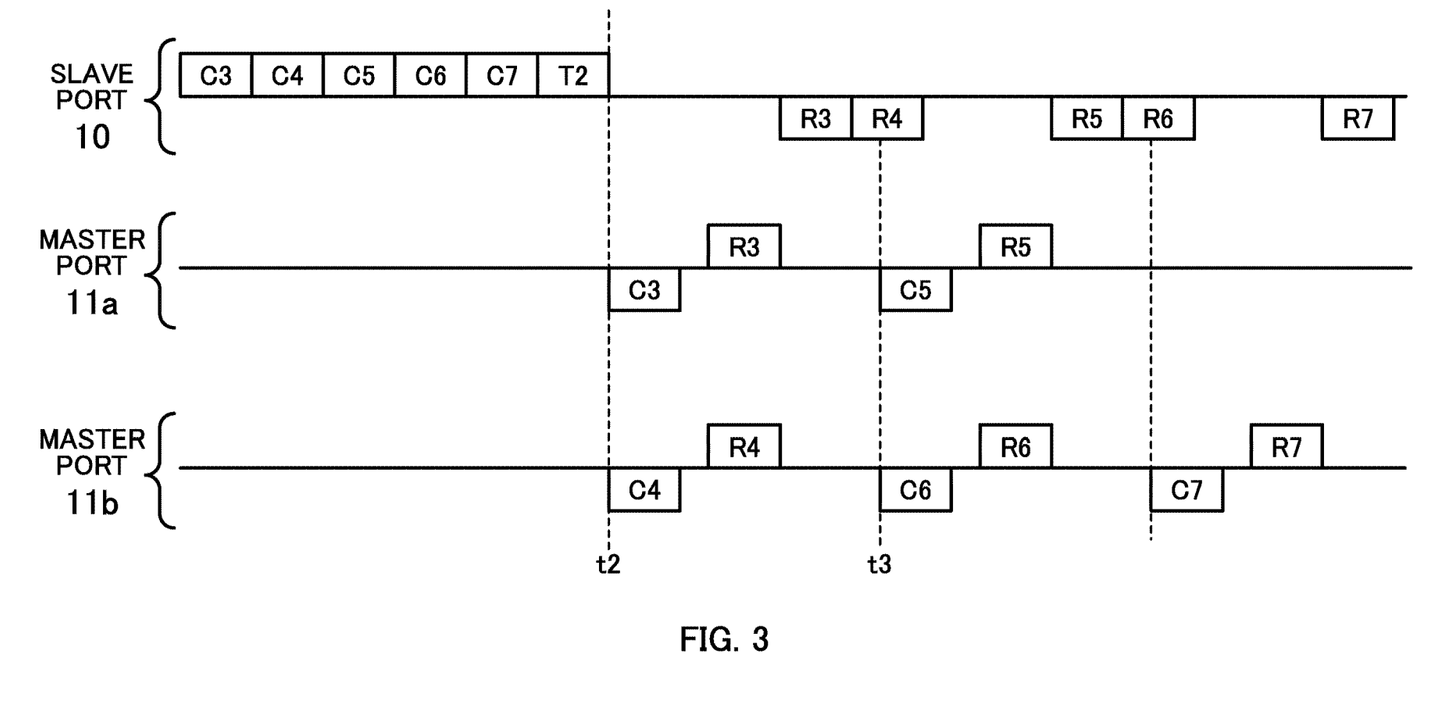
FIG. 3 is a schematic diagram provided for describing operation example 2 of the master apparatus according to the embodiment of the present disclosure.

Hereinafter, operation of master apparatus 1 will be described with reference to FIGS. 2 and 3. FIG. 2 is a schematic diagram provided for describing operation example 1 of master apparatus 1. FIG. 3 is a schematic diagram provided for describing operation example 2 of master apparatus 1. In FIGS. 2 and 3, a time axis progresses from left to right. Further, in each port illustrated in FIGS. 2 and 3, the upper side indicates a reception (input) side, and the lower side indicates a transmission (output) side. Further, in FIGS. 2 and 3, the corresponding commands are illustrated with the same reference signs and the corresponding responses are illustrated with the same reference signs in order to simplify the description. However, the commands denoted by the same reference signs are actually different signals from each other, and the responses denoted by the same reference signs are actually different signals from each other.

In operation examples 1 and 2, a case where master apparatus 1 and slave apparatuses 3a and 3b perform CRM communication will be described as an example.

Operation example 1 is a case where one command is stored in each of buffer memories 12a and 12b. Operation example 2 is a case where two or more commands are stored in each of buffer memories 12a and 12b.

Operation example 1 will be described with reference to FIG. 2.

First, slave port 10 receives command C1, command C2, and destination information from ECU 2. The destination information is information that indicates a destination of each of commands C1 and C2 (for example, register address information). Then, commands C1 and C2, and the destination information are output to control section 13.

It is assumed here, as an example, that command C1 is a command addressed to slave apparatus 3a, and command C2 is a command addressed to slave apparatus 3b. Further, it is assumed here, as an example, that command C1 is an instruction to transmit sound waves and to receive reflected waves, and command C2 is an instruction to receive reflected waves. Further, it is assumed here, as an example, that commands C1 and C2 to be output from master ports 11a and 11b are CRM unicast commands.

Next, control section 13 recognizes the destination of each of commands C1 and C2 based on the destination information. Then, control section 13 stores command C1 addressed to slave apparatus 3a in buffer memory 12a, and stores command C2 addressed to slave apparatus 3b in buffer memory 12b.

Next, from ECU 2, slave port 10 receives transmission instruction trigger T1 that is an instruction to transmit commands C1 and C2. Then, transmission instruction trigger T1 is output to control section 13.

When control section 13 receives transmission instruction trigger T1, control section 13 transmits command C1 stored in buffer memory 12a from master port 11a to slave apparatus 3a, and transmits command C2 stored in buffer memory 12b from master port 11b to slave apparatus 3b. The transmissions of commands C1 and C2 are performed simultaneously (see timing t1 illustrated in FIG. 2).

Next, although not illustrated, slave apparatus 3a stores command C1 upon reception thereof. Further, slave apparatus 3b stores command C2 upon reception thereof. Then, slave apparatus 3a transmits response R1 to command C1 to master apparatus 1. Further, slave apparatus 3b transmits response R2 to command C2 to master apparatus 1. Further, it is assumed here, as an example, that responses R1 and R2 are response signals indicating that commands C1 and C2 are normally recognized by slave apparatuses 3a and 3b, respectively.

Next, master port 11a receives response R1 from slave apparatus 3a. Further, master port 11b receives response R2 from slave apparatus 3b. Then, each of responses R1 and R2 is outputted to control section 13.

Next, control section 13 transmits responses R1 and R2 from slave port 10 to ECU 2.

Heretofore, operation example 1 has been described.

Next, operation example 2 will be described with reference to FIG. 3. As described above, operation example 2 is the case where two or more commands are stored in each of buffer memories 12a and 12b First, slave port 10 receives command C3 to C7, and destination information indicating a destination of each of commands C3 to C7 from ECU 2. Then, commands C3 to C7, and the destination information are output to control section 13.

It is assumed here, as an example, that commands C3 and C5 are commands addressed to slave apparatus 3a, and commands C4, C6, and C7 are commands addressed to slave apparatus 3b. Further, it is assumed here, as an example, that command C3 to C7 to be output from master ports 11a and 11b are CRM unicast commands.

Next, control section 13 recognizes the destination of each of commands C3 to C7 based on the destination information. Then, control section 13 stores commands C3 and C5 addressed to slave apparatus 3a in buffer memory 12a, and stores commands C4, C6, and C7 addressed to slave apparatus 3b in buffer memory 12b.

Next, from ECU 2, slave port 10 receives transmission instruction trigger T2 that is an instruction to transmit commands C3 to C7. Then, transmission instruction trigger T2 is output to control section 13.

When control section 13 receives transmission instruction trigger T2, control section 13 transmits commands C3 and C5 stored in buffer memory 12a in this order from master port 11a to slave apparatus 3a. Further, control section 13 transmits commands C4, C6, and C7 stored in buffer memory 12b in this order from master port 11b to slave apparatus 3b. The transmissions of commands C3 and C4 are performed simultaneously (see timing t2 illustrated in FIG. 3). Further, the transmissions of commands C5 and C6 are performed simultaneously (see timing t3 illustrated in FIG. 3).

Although not illustrated, slave apparatus 3a stores commands C3 and C5 upon reception thereof. Further, slave apparatus 3b stores commands C4, C6, and C7 upon reception thereof. Then, slave apparatus 3a transmits response R3 to command C3 and response R5 to command C5 in this order to master apparatus 1. Further, slave apparatus 3b transmits response R4 to command C4, response R6 to command C6, and response R7 to command C7 in this order to master apparatus 1. Further, it is assumed here, as an example, that responses R3 to R7 are response signals indicating that commands C3 to C7 are normally recognized by slave apparatuses 3a and 3b, respectively.

Next, master port 11a receives responses R3 and R5 in this order from slave apparatus 3a. Further, master port 11b receives responses R4, R6, and R7 in this order from slave apparatus 3b. Then, responses R3 to R7 are sequentially outputted to control section 13.

Next, control section 13 sequentially transmits responses R3 to R7 from slave port 10 to ECU 2. Note that, in this case, responses R3 and R5 may be transmitted in this order from slave apparatus 3a, and responses R4, R6, and R7 may be transmitted in this order from slave apparatus 3b. Accordingly, for example, responses R3, R5, R4, R6, and R7 may be transmitted in this order, or responses R4, R6, R3, R5, and R7 may be transmitted in this order.

Heretofore, operation example 2 has been described.

Note that, in operation examples 1 and 2, the case where commands C1 to C7 are CRM unicast commands has been described as an example, but commands Cl to C7 may be CRM global commands. Further, in operation example 2, the case where the commands addressed to slave apparatus 3a are two and the commands addressed to slave apparatus 3b are three has been described as an example, but the number of commands is not limited thereto.

As described above, the master apparatus of the present embodiment includes two or more master ports connected to slave apparatuses and two or more buffer memories corresponding to the respective master ports, and is characterized in that commands stored in the respective buffer memories are simultaneously transmitted to the respective slave apparatuses. Thus, it is possible to realize synchronization control between two or more slave apparatuses. Accordingly, for example, in a case where the slave apparatuses are ultrasonic sonar sensors, timings of starting wave transmission can be synchronized in the respective slave apparatuses so that an accurate distance estimation can be realized by measuring each time of wave reception.

In the embodiment described above, the term "section" used to indicate each constituent element may be interchangeably referred to as any other term such as "circuit (circuitry)", "device", "unit", or "module".

<Modifications of the Present Disclosure>

Note that, the present disclosure is not limited to the embodiment described above, and various modifications may be made within the scope of the present disclosure without departing from the spirit thereof.

[Modification 1]

In the case where control section 13 receives a transmission instruction trigger from ECU 2 in the embodiment, control section 13 may read a command from a buffer memory corresponding to a channel (that may be replaced with a master port) designated by ECU 2 in advance, and may transmit the read command from the master port corresponding to the buffer memory.

For example, it is assumed that master apparatus 1 includes master ports for four channels (hereinafter, referred to as CH1 to CH4), and four buffer memories that are separately provided corresponding to the master ports.

Further, it is assumed, for example, that control section 13 stores commands in the respective four buffer memories, and then receives CH1 and CH3 designation from ECU 2. Thereafter, upon reception of a transmission instruction trigger issued by ECU 2, control section 13 reads the commands from the buffer memories corresponding to CH1 and CH3 that have been designated, and transmits the commands from the master ports corresponding to CH1 and CH3. In this case, no commands are transmitted from the master ports corresponding to CH2 and CH4.

Note that, the channel designation from ECU 2 may be performed before storing commands in the respective buffer memories.

Further, in the description described above, the case where commands are stored in the respective four buffer memories, and then CH1 and CH3 are designated by ECU 2 has been described as an example, but such a case is not restrictive. For example, CH1 and CH3 may be designated by ECU 2 after storing commands in the respective buffer memories corresponding to CH1 and CH3 among the four buffer memories. In this case, in the same manner as described above, when control section 13 receives a transmission instruction trigger issued by ECU 2, control section 13 also reads the commands from the buffer memories corresponding to CH1 and CH3 that have been designated, and transmits the commands from the master ports corresponding to CH1 and CH3.

Thus, in the present modification, it is possible to select slave apparatuses that are desirably synchronized so that the degree of freedom of controlling slave apparatuses can be improved. For example, among two or more ultrasonic sonar sensors installed on a vehicle, two or more ultrasonic sonar sensors that perform sensing of a forward side of a vehicle may be selected and be synchronized, or two or more ultrasonic sonar sensors that perform sensing of a rear side of a vehicle may be selected and be synchronized.

Further, in a case where the number of stages of a buffer memory is one, a transmitted command may not be erased and may remain in the buffer memory. In this case, the command may be transmitted again. In the present modification, on the other hand, channels with which the transmission is performed can be selected so that unnecessary command transmissions can be avoided.

[Modification 2]

In the embodiment, as illustrated in FIG. 1A, the case where one slave apparatus is electrically connected to one master port has been described as an example, but such a case is not restrictive.

Figure 4:
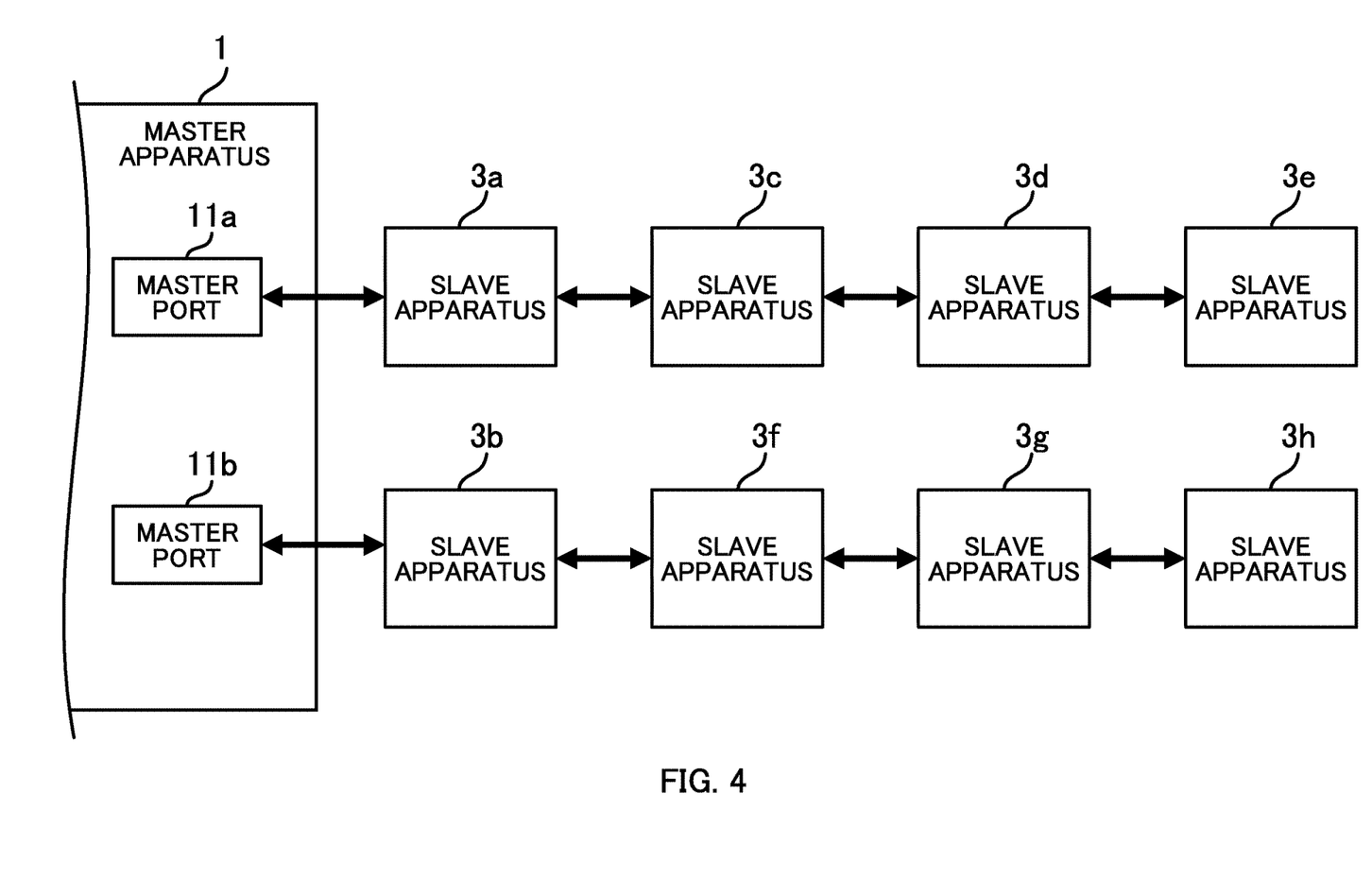
FIG. 4 is a schematic diagram of a connection example of slave apparatuses according to Modification 2 of the present disclosure.

For example, as illustrated in FIG. 4, master port 11a and slave apparatuses 3a, 3c, 3d, and 3e may be connected by daisy chain connection, and master port 11b and slave apparatuses 3b, 3f, 3g, and 3h may be connected by daisy chain connection. Slave apparatuses 3c, 3d, 3e, 3f, 3g, and 3h illustrated in FIG. 4 are, for example, on-vehicle ultrasonic sonar sensors as with slave apparatuses 3a and 3b.

Note that, although FIG. 4 exemplifies a case where the number of slave apparatuses connected to each of master ports 11a and 11b by daisy chain connection is four, the number of slave apparatuses connected by daisy chain connection is not limited to four, and a different number of slave apparatuses may be connected to each of master ports 11a and 11b. Further, illustration of constituent elements (slave port 10, buffer memories 12a and 12b, and control section 13 illustrated in FIG. 1A) other than master ports 11a and 11b in master apparatus 1 is omitted in FIG. 4.

Figure 5:
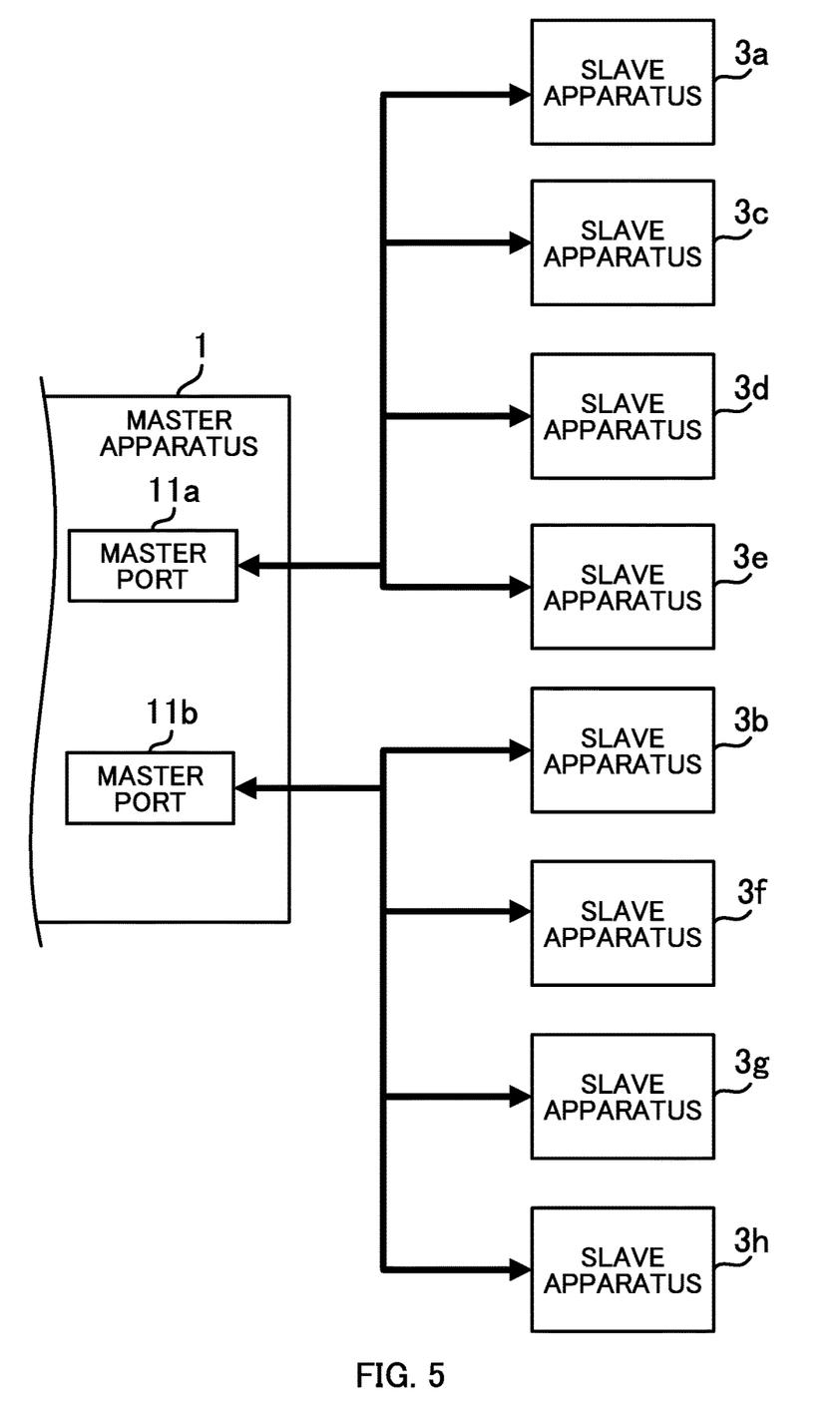
FIG. 5 is a schematic diagram of a connection example of the slave apparatuses according to Modification 2 of the present disclosure.

For example, as illustrated in FIG. 5, master port 11 a may be connected to slave apparatuses 3a, 3c, 3d, and 3e by parallel bus connection, and master port 11b may connected to slave apparatuses 3b, 3f, 3g, and 3h by parallel bus connection. Slave apparatuses 3c, 3d, 3e, 3f, 3g, and 3h illustrated in FIG. 5 are, for example, on-vehicle ultrasonic sonar sensors as with slave apparatuses 3a and 3b.

Note that, although FIG. 5 exemplifies a case where the number of slave apparatuses connected to each of master ports 11a and 11b by parallel bus connection is four, the number of slave apparatuses connected by parallel bus connection is not limited to four, and a different number of slave apparatuses may be connected to each of master ports 11a and 11b. Further, illustration of constituent elements (slave port 10, buffer memories 12a and 12b, and control section 13 illustrated in FIG. 1A) other than master ports 11a and 11b in master apparatus 1 is omitted in FIG. 5.

<Summary of Present Disclosure>

The present disclosure is summarized as follows.

A communication apparatus of the present disclosure is a communication apparatus that is installed on a vehicle as a master apparatus, including: a slave port that is used in communication with an on-vehicle control apparatus; two or more master ports that are paired with two or more slave apparatuses installed on the vehicle, and communicate with the two or more slave apparatuses using different channels c based on Distributed System Interface (DSI) protocol; two or more buffer memories that are paired with the two or more master ports; and a control section that sorts and stores commands addressed to the two or more slave apparatuses, respectively, received from the on-vehicle control apparatus into the two or more buffer memories, respectively, and when the control section receives a trigger instructing transmission of the commands from the on-vehicle control apparatus, the control section reads the commands from the two or more buffer memories, and simultaneously transmits the commands from the two or more master ports, respectively.

In the communication apparatus of the present disclosure, in a case where the control section receives designation of a channel from the on-vehicle control apparatus in advance, when the control section receives the trigger, the control section reads the command from the buffer memory corresponding to the designated channel, and transmits the command from the master port corresponding to the buffer memory.

In the communication apparatus of the present disclosure, at least two of the two or more slave apparatuses are connected to each of the two or more master ports by daisy chain connection or parallel bus connection.

In the communication apparatus of the present disclosure, at least one of the two or more slave apparatuses is an ultrasonic sonar sensor that performs sensing of a periphery of the vehicle.

A communication system of the present disclosure includes: the communication apparatus of the present disclosure that is used as a master apparatus; two or more slave apparatuses that communicate with the communication apparatus; and an on-vehicle control apparatus that communicates with the communication apparatus.

According to the present disclosure, synchronization control between two or more slave apparatuses can be realized.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2019-132897, filed on Jul. 18, 2019, the disclosure of which including the specification, drawings and abstract is incorporated herein by reference in its entirety.

INDUSTRIAL APPLICABILITY

The communication apparatus and the communication system of the present disclosure are useful for a technique of synchronizing two or more slave apparatuses.

REFERENCE SIGNS LIST

1 Master apparatus
2 ECU
3a, 3b, 3c, 3d, 3e, 3f, 3g, 3h Slave apparatus
10 Slave port
11a, 11b Master port
12a, 12b Buffer memory
13 Control section
100 Communication system

The invention claimed is:

1. A communication apparatus installed on a vehicle as a master apparatus, comprising:
    a slave port that is used in communication with an on-vehicle control apparatus;
    two or more master ports that are paired with two or more slave apparatuses installed on the vehicle, and communicate with the two or more slave apparatuses using different channels based on Distributed System Interface (DSI) protocol;
    two or more buffer memories that are paired with the two or more master ports; and
    a control circuit that sorts and stores commands addressed to the two or more slave apparatuses, respectively, received from the on-vehicle control apparatus into the two or more buffer memories, respectively, and when the control circuit receives a trigger instructing transmission of the commands from the on-vehicle control apparatus, the control circuit reads the commands from the two or more buffer memories, and simultaneously transmits the commands from the two or more master ports, respectively.

2. The communication apparatus according to claim 1, wherein the control circuit receives designation of a channel from the on-vehicle control apparatus, and when the control circuit receives the trigger, the control circuit reads the command from the buffer memory paired for the designated channel, and transmits the command from the master port corresponding to the buffer memory.

3. The communication apparatus according to claim 1, wherein at least two of the two or more slave apparatuses are connected to at least one of the two or more master ports by daisy chain connection.

4. The communication apparatus according to claim 1, wherein at least two of the two or more slave apparatuses are connected to at least one of the two or more master ports by parallel bus connection.

5. The communication apparatus according to claim 1, wherein at least one of the two or more slave apparatuses is an ultrasonic sonar sensor that performs sensing of a periphery of the vehicle.

6. A communication system comprising:
    the communication apparatus according to claim 1 that is used as a master apparatus;
    two or more slave apparatuses that communicate with the communication apparatus; and
    an on-vehicle control apparatus that communicates with the communication apparatus.

* * * * *